Figure 1:
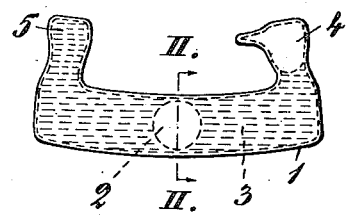

Nov. 17, 1942.   H. R. W. WEIBULL   2,302,282

LEVEL FOR SHEERING INDICATORS

Filed May 23, 1941

Inventor
H. R. W. Weibull

By: Glascock Downing & Seebold
Attys

Patented Nov. 17, 1942

2,302,282

UNITED STATES PATENT OFFICE 2,302,282

LEVEL FOR SHEERING INDICATORS

Hans Richard Waloddi Weibull, Stockholm, Sweden

Application May 23, 1941, Serial No. 394,931
In Sweden September 4, 1940

1 Claim. (Cl. 33—211)

The present invention refers to an improved arrangement in such levels which are intended for sheering indicators in aircraft.

As is well known, the levels of this type comprise a slightly bent tube from glass or other transparent material, said tube having a steel ball or the like housed therein, which functions as an indicator and which, when the sheer is correctly performed, is to remain in its middle position within the tube due to the fact that the centrifugal force determined by the radius of curvature of the sheer and actuating the indicator ball is balanced by the oppositely directed component of gravity to which the ball is subjected on account of the oblique position of the aircraft. On the other hand, when the sheer is performed incorrectly, the ball, which has a diameter somewhat smaller than the inner diameter of the tube, will be displaced in the one or the other direction from its middle position.

In certain known constructions of such levels the tube contains a damping liquid, by which the rate of movement of the ball is damped to a suitable extent for the observations, and, in order to prevent the liquid from bursting the tube at a rise of the temperature, an additional space communicating with the tube used to be provided at one end of the tube, or between both ends thereof, said space being not filled by liquid in normal cases and thus permitting expansion therein of the liquid at a rise of the temperature.

It has been found, however, that this partial filling of the level with liquid entails disadvantages in cases where the aircraft is flown in looping or some other course deviating from the normal one. Generally, the expansion space will then be filled with liquid, while a corresponding bubble enters the tube proper, said bubble being of very great hinderance to the movements of the indicator ball and to the observations of the position of the ball. When flying in the normal position has been resumed, the return of the ball into the middle position will be unduly delayed, and there may even occur improper movements of the ball due to the movements of the liquid in connection with the simultaneous wandering of the expansion bubble back into its corresponding normal position within the expansion space.

The present invention refers to an arrangement through which these drawbacks are considerably reduced, and which is primarily distinguished by the fact that an expansion space for the liquid is provided at each end of the tube. Each one of the expansion spaces is large enough to be capable alone to receive the internal gas bubble in the tube, and preferably the expansion spaces are substantially of the same size mutually. This arrangement brings about among others a considerably quicker and more favourable course of motion of the indicator ball and of the gas bubble in their returning to their normal positions after flying in an abnormal position or inclination of the aircraft.

Figure 2:
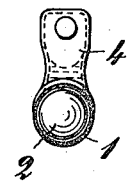

A form of embodiment of the invention is illustrated in the accompanying drawing. Fig. 1 shows a longitudinal section through the level tube, and Fig. 2 represents a cross section on line II—II in Fig. 1.

A ball 2 is housed within the slightly arcuate level tube 1 which is made from glass. Marks are provided on the tube 1 or on the non-illustrated holder thereof to facilitate the reading of the middle position of the ball and of the magnitude of its deviations from this position. The tube 1 is filled with a suitable, readily movable damping liquid 3. At each end of the tube 1 is an expansion chamber 4 and 5 formed, which communicate directly with the interior of the tube. These expansion chambers are substantially of the same size mutually. The combined internal volume of the tube 1 and of these two expansion chambers 4 and 5 is filled with liquid, save for a portion thereof corresponding to or falling somewhat below the volume of one of the expansion chambers. Thus the drawing shows the tube 1 and the expansion chamber 5 as being filled with liquid, while the expansion chamber 4 is substantially empty.

The expansion chambers 4 and 5 may be made from the same mass of glass, for example, as the level tube.

The arrangement described is only selected as an example for the elucidation of the invention, and the details thereof may be modified in various ways, without the scope of the invention being exceeded thereby.

Having now particularly described the nature of my invention and the manner of its operation, what I claim is:

Level for sheering indicators comprising, a slightly arcuate and transparent tube, an indicator ball inserted in said tube, an expansion chamber at each end of said tube and communicating with the interior of said tube, said tube and said expansion chambers being filled with a liquid save for a portion corresponding to or falling somewhat below the volume of one of said expansion chambers, each of said expansion chambers being sufficiently large for receiving alone the gas bubble in said tube.

HANS RICHARD WALODDI WEIBULL.